United States Patent
Kodama

[11] Patent Number: 5,835,272
[45] Date of Patent: Nov. 10, 1998

[54] ZOOM LENS

[75] Inventor: Naoko Kodama, Kawasaki, Japan

[73] Assignee: Nikon Corporation, Tokyo, Japan

[21] Appl. No.: 898,787

[22] Filed: Jul. 23, 1997

[30] Foreign Application Priority Data

Jul. 24, 1996 [JP] Japan ................................ 8-213107

[51] Int. Cl.$^6$ .......................... G02B 27/64; G02B 15/14; G02B 3/02; G02B 9/00
[52] U.S. Cl. .......................... 359/557; 359/682; 359/684; 359/686; 359/715; 359/740
[58] Field of Search ................................... 359/557, 682, 359/684, 686, 715, 740

[56] References Cited

U.S. PATENT DOCUMENTS

| 3,771,853 | 11/1973 | Nakamaru | 359/686 |
| 4,516,839 | 5/1985 | Tokumaru | 359/686 |
| 4,591,235 | 5/1986 | Tokumaru et al. | 359/686 |
| 4,759,617 | 7/1988 | Tokumaru et al. | 359/686 |
| 5,132,848 | 7/1992 | Nishio et al. | 359/686 |
| 5,315,441 | 5/1994 | Hori et al. | 359/686 |
| 5,329,401 | 7/1994 | Sato | 359/684 |
| 5,576,890 | 11/1996 | Tanaka et al. | 359/686 |
| 5,663,835 | 9/1997 | Shibayama | 359/686 |
| 5,675,439 | 10/1997 | Nakatsuji | 359/684 |
| 5,748,384 | 5/1998 | Sensui | 359/686 |

FOREIGN PATENT DOCUMENTS 2-56644  11/1990  Japan .
6-82698  3/1994  Japan .

Primary Examiner—David C. Nelms
Assistant Examiner—Evelyn A. Lester
Attorney, Agent, or Firm—Chapman and Cutler

[57] ABSTRACT

A zoom lens is provided such that it has a high image quality over its entire zooming range, an angle of view of 70° or greater at a wide-angle end, a zooming ratio of 2.5 or greater, and an F-number of about 2.8 throughout the entire range. The zoom lens has a first lens group having a negative refractive power, a second lens group having a positive refractive power, a third lens group having a negative refractive power, and a fourth lens group having a positive refractive power. The first, second, third and fourth lens groups are arranged in order from the object side of the zoom lens. The zoom lens also has an aperture stop. The third lens group has at least one concave aspheric surface. During zooming, at least the first, second and fourth lens groups are moved along the optical axis. The zoom lens satisfies the condition $0.5 < (A_w/l_w)/(A_t/l_t) < 1$ when $A_w$ is a distance between the image plane and the lens plane that is located closest to the object side in the fourth lens group when the zoom lens is at a wide-angle end, $A_t$ is a distance between the image plane and the lens plane that is located closest to the object side in the fourth lens group when the zoom lens is at a telephoto end, $l_w$ is a distance between the image plane and the aperture stop at the wide-angle end, and $l_t$ is a distance between the image plane and the aperture stop at the telephoto end.

20 Claims, 9 Drawing Sheets

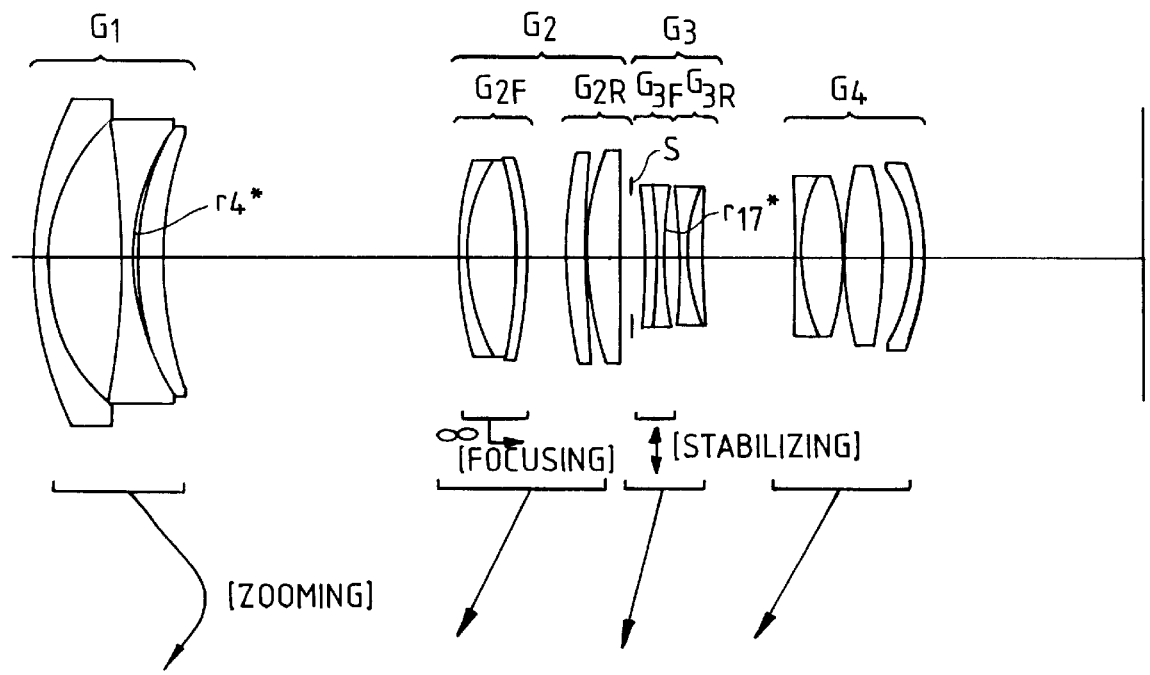

$F_{NO}=2.9$ 1.000
SPHERICAL
ABERRATION

Y=21.6

1.000
ASTIGMATISM

Y=21.6

5.000%
DISTORTIONAL
ABERRATION $F_{NO}=2.9$ 1.000
SPHERICAL
ABERRATION

Y=21.6

1.000
ASTIGMATISM

Y=21.6

5.000%
DISTORTIONAL
ABERRATION $F_{NO}=2.9$

SPHERICAL ABERRATION
1.000

Y=21.6

S
M

ASTIGMATISM
1.000

Y=21.6

DISTORTIONAL ABERRATION
5.000%

NA=0.17

SPHERICAL ABERRATION
1.000

Y=21.6

S
M

ASTIGMATISM
1.000

Y=21.6

DISTORTIONAL ABERRATION
5.000%

NA=0.17

1.000
SPHERICAL ABERRATION

Y=21.6

1.000
ASTIGMATISM

Y=21.6

5.000%
DISTORTIONAL ABERRATION

NA=0.17

1.000
SPHERICAL ABERRATION

Y=21.6

1.000
ASTIGMATISM

Y=21.6

5.000%
DISTORTIONAL ABERRATION

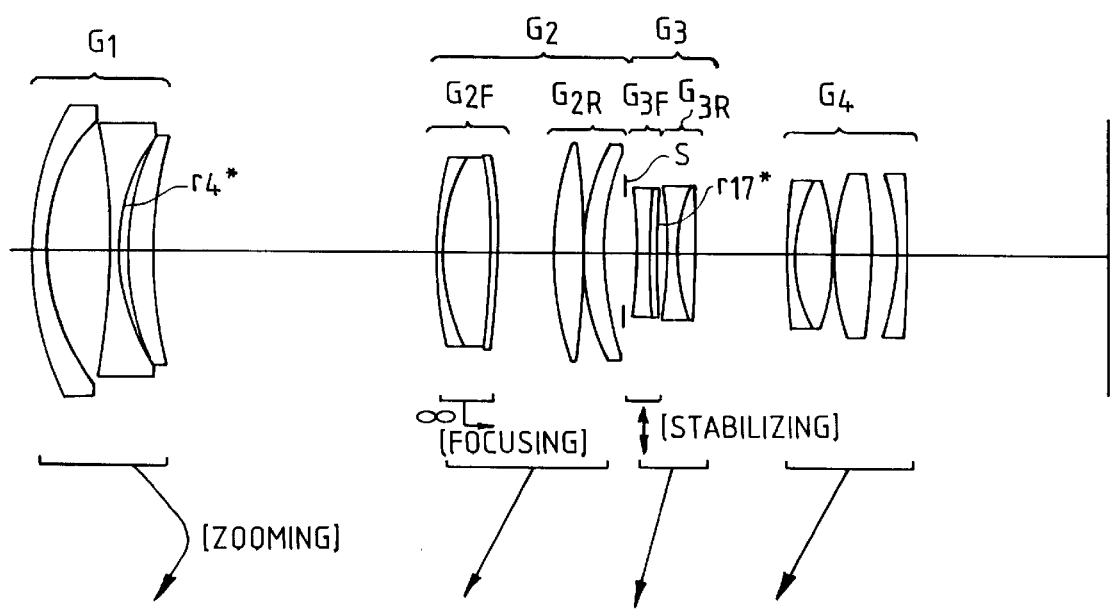

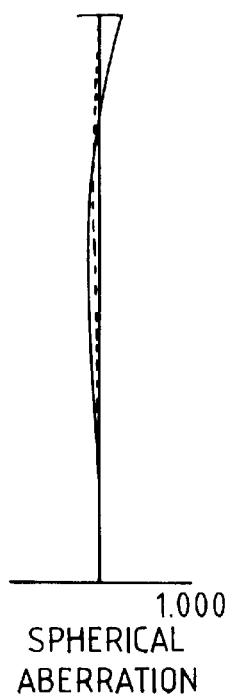
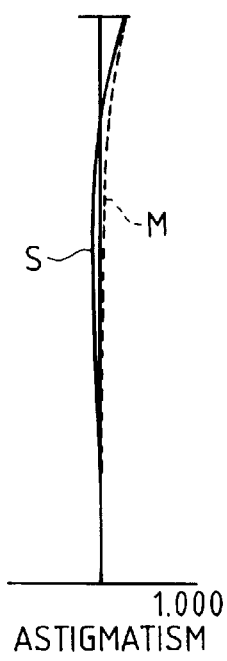
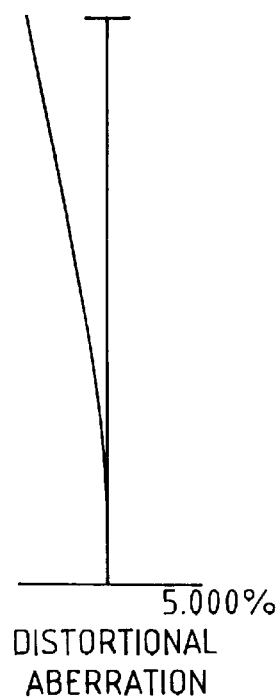
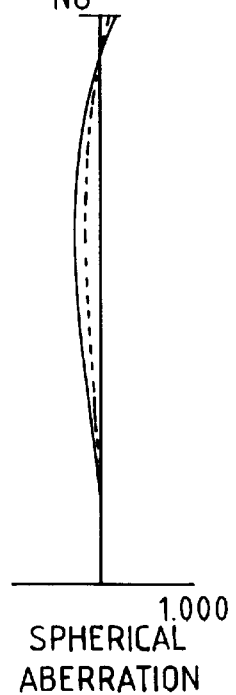
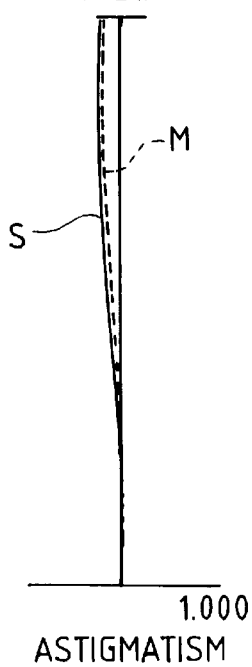
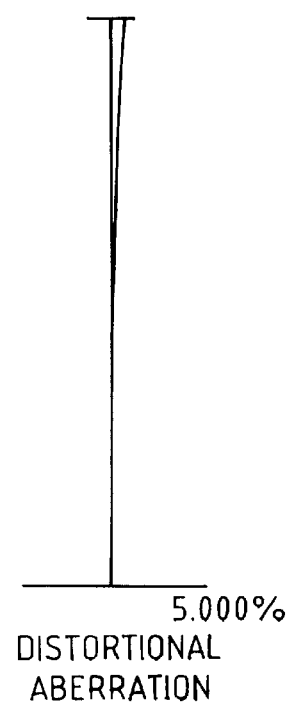

$F_{NO}=2.9$ 1.000
SPHERICAL
ABERRATION

Y=21.6

1.000
ASTIGMATISM

Y=21.6

5.000%
DISTORTIONAL
ABERRATION

NA=0.17

1.000
SPHERICAL
ABERRATION

Y=21.6

1.000
ASTIGMATISM

Y=21.6

5.000%
DISTORTIONAL
ABERRATION

NA=0.17

1.000
SPHERICAL
ABERRATION

Y=21.6

1.000
ASTIGMATISM

Y=21.6

5.000%
DISTORTIONAL
ABERRATION

NA=0.16

1.000
SPHERICAL
ABERRATION

Y=21.6

1.000
ASTIGMATISM

Y=21.6

5.000%
DISTORTIONAL
ABERRATION

ZOOM LENS

BACKGROUND OF THE INVENTION

1. Field of the Invention

This invention relates to a zoom lens and, more particularly, to a zoom lens used with, for example, a single-lens reflex camera.

2. Description of Related Art

A zoom lens including a negative lens group positioned at its object side is useful as a wide-angle photographic lens. Such a lens has conventionally been used as a wide-angle zoom lens. However, in this type of zoom lens, the aperture stop diameter is inevitably large. This prevents the entire lens system from being made compact. If the lens system is made unreasonably small, then it becomes difficult to correct for spherical aberration and astigmatism during telephoto operation when the aperture stop is open. At the same time, chromatic aberration of magnification becomes large during wide-angle operation. When this type of lens is used as a photographic zoom lens over a broad range of wavelengths, it is especially difficult to maintain a good image quality over the entire zoom range. This defect becomes conspicuous in a large-aperture zoom lens having a maximum aperture ratio of about 2.8.

Japanese laid-open patent application No. 6-82698 and Japanese examined patent publication No. 2-56644 propose an improved zoom lens which eliminates the problems mentioned above. The improved zoom lens has four lens groups having a negative-positive-negative-positive power arrangement from the object side. Among the lens groups, certain lens groups are appropriately moved to change the power of the zoom lens. In such an improved zoom lens, however, the zoom ratio is often less than 2.5, although the F-number does have a satisfactory value of about 2.8 and an angle of view of 70° or greater is achieved. If a zoom lens has a zoom ratio of 2.5 or greater, then when the F-number drops to less than 2.8, insufficient brightness results.

SUMMARY OF THE INVENTION

In a zoom lens that has a negative front lens group, it is necessary to appropriately select a lens structure and a refractive power arrangement of the lens groups contained in the zoom lens. Proper lens structure selection and lens group arrangement permit achievement of excellent optical performance over an entire zoom range of the lens while maintaining a prescribed back focus. An angle of view of 70° or greater during wide-angle operation can be achieved. The lens must be able to provide a zoom ratio of 2.5 or greater and a full-range F-number of about 2.8. If the refractive power arrangement of the lens groups and the overall lens structure are inappropriate, then fluctuation in aberration becomes large when changing the power. This is the case even when a number of lenses is used in the zoom lens. It is difficult, therefore, to maintain high optical-performance over the entire variable power range.

It is an object of this invention to provide a zoom lens which can stably achieve a high image quality over the entire variable power range and yet provide an angle of view of 70° or greater at the wide-angle end, a zoom ratio of 2.5 or greater, and a full-range F-number of about 2.8. The zoom lens of the present invention has four lens groups with a negative-positive-negative-positive power arrangement from the object side. A lens group having a negative refractive power is positioned at the front of the zoom lens. The object of the invention is achieved by appropriately selecting a refractive power of a lens group arrangement, a lens structure, and a position of an aspheric surface.

The zoom lens according to the invention includes a first lens group having a negative refractive power, a second lens group having a positive refractive power, a third lens group having a negative refractive power, and a fourth lens group having a positive refractive power. The lens groups are arranged in this order from the object side of the zoom lens. The zoom lens also has an aperture stop. The third lens group has an aspheric lens that has at least one concave and aspheric surface. At least the first, second and fourth lens groups are moved in the optical-axis direction upon zooming. The zoom lens can satisfy the following condition:

$$0.5 < (A_w/l_w)/(A_t/l_t) < 1 \qquad (1)$$

when $A_w$ is a distance, in mm, between the image plane and the lens plane that is located closest to the object side in the fourth lens group when the zoom lens is at a wide-angle end (i.e., during wide-angle operation), $l_w$ is a distance, in mm, between the image plane and the aperture stop at the wide-angle end, $A_t$ is a distance, in mm, between the image plane and the lens plane that is located closest to the object side in the fourth lens group when the zoom lens is at a telephoto end (i.e., during telephoto operation), and $l_t$ is a distance, in mm, between the image plane and the aperture stop at the telephoto end.

In this arrangement, sufficient corrections for astigmatism and coma of the lens are made over the entire wide-angle end to telephoto end range. Because an aspheric surface is applied to a concave lens surface in the third lens group and a light beam can be greatly deflected, the aberrations are efficiently corrected.

Formula or condition (1) expresses the positional relationship between the aperture stop and the fourth lens group at the wide-angle and telephoto ends. The significance of Formula (1) will be explained in connection with FIGS. 15A and 15B. FIG. 15A shows the lens arrangement of the first embodiment at the wide-angle end. FIG. 15B shows the lens arrangement at the telephoto end. In FIGS. 15A and 15B, $c_w$ and $c_t$ denote the principal rays defining a maximum image height at the wide-angle end and the telephoto end, respectively. The reference characters $a_w$ and $a_t$ designate upper rays corresponding to $c_w$ and $c_t$, respectively. The reference characters $h_w$ and $h_t$ designate heights of the incident points (indicated by black dots), from the optical axis, at which the upper rays $a_w$ and $a_t$ strike the aspheric surface of the third lens group $G_3$.

In the lens arrangement of the present invention, the third lens group $G_3$ has a negative power and the fourth lens group has a positive power. If $h_w < h_t$, then coma in a telephoto condition can be efficiently corrected by the aspheric surface of the third lens group $G_3$. The relation $h_w < h_t$ is satisfied when the fourth lens group $G_4$ moves toward the object side to change a power (magnification) and changes the lens from the wide-angle end to the telephoto end. The distance between the third lens group $G_3$ and the fourth lens group $G_4$ decreases as a result of the movement of the fourth lens group $G_4$. This corresponds to a case in which the value of condition (1) becomes small.

A small value of condition (1) is advantageous for correcting aberrations; however, if the value is below the lower limit, then the amount by which the fourth lens group $G_4$ moves becomes large and, as a result, the distance from the third lens group $G_3$ can no longer be maintained. In order to maintain the distance between the third and fourth lens groups $G_3$ and $G_4$, the entire lens system must be made large. Meanwhile, the value of condition (1) exceeds the upper limit when the third and fourth lens groups $G_3$ and $G_4$ are fixed, or the fourth lens group $G_4$ moves toward the image side. If the third and fourth lens groups $G_3$ and $G_4$ are fixed, then a condition in which $h_w \approx h_t$ is established and it becomes difficult to correct for coma. If the fourth lens group moves toward the image side, then it is difficult to achieve a high zoom ratio while maintaining the position of the image plane constant.

In condition (1), it is preferable to set the upper limit at 0.85 to correct for coma aberrations more efficiently and to make the optical system compact.

The aspheric lens having an aspheric surface in the third lens group $G_3$ may be a cemented lens. In this case, on-axis chromatic aberration can be efficiently corrected.

An aperture stop is positioned in the vicinity of the third lens group $G_3$. In this arrangement, rays, which have been converged by the second lens group $G_2$ with a positive refractive power, can enter the aperture stop in a sufficiently narrowed state, thereby reducing the diameter of the aperture stop. When changing power, the aperture stop moves, together with the third lens group $G_3$, along the optical axis. Accordingly, movement of other lens groups positioned before and after the aperture stop is not restricted even during an aperture stop change. The degree of freedom, from a design aspect, is improved, and aberrations are efficiently corrected.

The third lens group $G_3$ consists of a front lens group $G_{3F}$ and a rear lens group $G_{3R}$, one of which includes an aspheric surface. The lens group that has the aspheric surface can be moved in a direction across the optical axis for stabilizing correction. Because the stabilizing mechanism is positioned near the aperture stop, fluctuations in aberrations caused by moving the lens group in the off-axis direction (i.e., decentering) can be suppressed.

According to another aspect of the invention, a zoom lens is provided with a first lens group having a negative refractive power, a second lens group having a positive refractive power, a third lens group having a negative refractive power, and a fourth lens group having a positive refractive power, in order from the object side. At least the first, second and fourth lens groups are moved in the optical-axis direction during zooming. The fourth lens group has a cemented positive lens component having a cemented convex surface on the object side, a positive lens component, and a negative meniscus lens component convexed toward the image side. The cemented positive lens component, the positive lens component and the negative meniscus lens component are arranged in order from the object side. The fourth lens group $G_4$ can satisfy the following condition:

$$0.3 < R_{42}/f_4 < 1.5 \qquad (2)$$

when $R_{42}$ is a radius of curvature of the cemented convex surface of the fourth lens group and $f_4$ is a focal length of the fourth lens group.

The cemented convex surface, which is positioned on the object side in the fourth lens group $G_4$, corrects for spherical aberration and astigmatism. If $R_{42}/f_4$ is below the lower limit of condition (2), then aberrations cannot be adequately corrected. If $R_{42}/f_4$ exceeds the upper limit, then the amount of correction becomes excessive.

An aperture stop is positioned in the vicinity of the third lens group $G_3$ and moves together with the third lens group $G_3$ when changing power.

The lens component that is positioned closest to the image side in the first lens group $G_1$ and the lens component that is positioned adjacent to and on the object side of this image-side lens component constitute an air lens. This lens component is preferably shaped as a positive meniscus lens convexed to the object side. This arrangement is advantageous for correcting for a spherical aberration at the telephoto end.

The second lens group includes a cemented positive lens and two positive lenses in this order from the object side of the zoom lens, and satisfies the formula or condition:

$$(R_{22}+R_{21})/(R_{22}-R_{21}) < 0.95 \qquad (3)$$

when $R_{21}$ is a radius of curvature of the object-side lens surface of the positive lens that is located closest to the image side among the positive lenses of the second lens group and $R_{22}$ is a radius of curvature of the image-side lens surface of the positive lens that is located closest to the image side.

With this arrangement of the second lens group $G_2$, spherical aberrations or chromatic aberrations due to power changes can be efficiently corrected. In Formula (3), the radius R of curvature of a flat plane is defined as infinity ($\infty$). Formula (3) defines the lens shape of the positive lens that is positioned closest to the image side in the second lens group $G_2$. The lens shape which satisfies Formula (3) may be a positive meniscus lens convexed to the object side, a plano-convex lens with its convex surface on the object side, or a similar lens. If the value of Formula (3) is below the lower limit, then it becomes difficult to correct for a spherical aberration, especially at the telephoto end.

The cemented positive lens in the second lens group is composed of three lens components which are cemented to one another. Off-axis luminous flux passes through the lens apart from the optical axis. Consequently, chromatic aberration of magnification is efficiently corrected, and the thickness and the outer diameter of the lens can be reduced.

The second lens group $G_2$ consists of a front lens group $G_{2F}$ and a rear lens group $G_{2R}$. Focusing is performed by moving the front lens group $G_{2F}$ of the second lens group $G_2$ in the optical-axis direction. This arrangement improves the autofocus (AF) driving efficiency. As a result, in an optical system, an amount that a lens must be driven for focusing is reduced.

BRIEF DESCRIPTION OF THE DRAWINGS

FIG. 1 illustrates a lens arrangement according to a first embodiment of the invention.

FIG. 8 illustrates a lens arrangement according to a second embodiment of the invention.

FIG. 9 illustrates various aberrations of the second embodiment at a wide-angle end in an infinity focusing state.

FIG. 10 illustrates the same aberrations of the second embodiment at an intermediate range in the infinity focusing state.

DESCRIPTION OF THE PREFERRED EMBODIMENTS

Figure 2A:
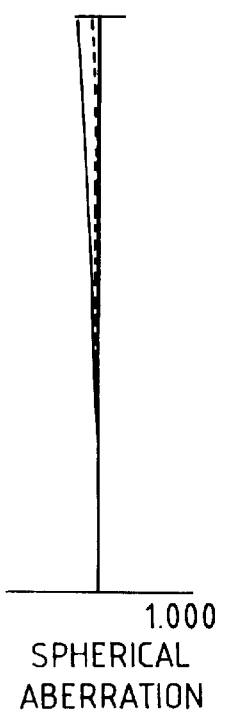
FIG. 2 illustrates various aberrations of the first embodiment at a wide-angle end in an infinity focusing state.

The zoom lens according to the first embodiment is a large-aperture lens having a focal length of 28.9–77.5 mm and an F-number of 2.9. The close range of the lens is set to 0.6 m. FIG. 1 illustrates the lens arrangement of the zoom lens of the first embodiment. In FIG. 1, the first through fourth lens groups $G_1$ through $G_4$ are positioned, in this order, from the object side. The first lens group $G_1$ includes a negative meniscus lens with its convex surface on the object side, a bi-concave lens having an aspheric surface on the image side, and a positive meniscus lens with the convex surface on the object side. The first lens group $G_1$ has a negative refractive power as a whole. The second lens group $G_2$ includes a front lens group $G_{2F}$, which is a cemented lens in which three lenses are cemented together with one another, and a rear lens group $G_{2R}$, which includes a positive meniscus lens with its convex surface on the object side and a bi-convex lens which is very similar to a plano-convex lens. The positive meniscus and bi-convex lenses are assembled in order from the object side. The second lens group $G_2$ has a positive refractive power as a whole. The third lens group $G_3$ consists of a front lens group $G_{3F}$, which is a cemented lens in which a meniscus lens and a bi-concave lens that has an aspheric surface on the image side are cemented, and a rear lens group $G_{3R}$, which is also a cemented lens in which a bi-concave lens and a meniscus lens are cemented. The third lens group $G_3$ has a negative refractive power as a whole. The fourth lens group $G_4$ includes a positive cemented lens which has a convex cemented surface on the object side, a bi-convex lens, and a negative meniscus lens with its convex surface on the image side. The fourth lens group $G_4$ has a positive refractive power as a whole.

The zoom lens according to the second embodiment is a large-aperture lens which has a focal length of 28.9–82.5 mm, and an F-number of 2.9. The close range of the lens is set to 0.6 m. FIG. 8 illustrates the lens arrangement of the zoom lens of the second embodiment. The differences from the first embodiment reside in the second and third lens groups. In the second embodiment, the rear lens group $G_{2R}$ of the second lens group $G_2$ includes a bi-convex lens and a positive meniscus lens with its convex surface on the object side. The bi-convex and positive meniscus lenses are positioned in order from the object side. The front lens group $G_{3F}$ of the third embodiment is a cemented lens in which a bi-concave lens and a meniscus lens having an aspheric surface on the image side are cemented in this order from the object side. The rear lens group $G_{3R}$ of the third lens group $G_3$ is a cemented lens in which a bi-concave lens and a bi-convex lens are cemented together.

In each embodiment, zooming is performed by moving the first through fourth lens groups $G_1$ through $G_4$ along the optical axis in a mutually depending manner. Focusing is performed by moving the front lens group $G_{2F}$ of the second lens group $G_2$ along the optical axis. Stabilizing correction is made by moving the front lens group $G_{3F}$ of the third lens group $G_3$ in a direction across the optical axis. An aperture stop S is positioned between the second lens group $G_2$ and the third lens group $G_3$. During the zooming operation, the aperture stop S moves together with the third lens group $G_3$ along the optical axis.

Table 1 lists parameter values in connection with the zoom lens system and the conditional formula of the first embodiment. Table 2 indicates the same parameters in connection with the second embodiment. In "Major Parameters" of each table, f is a focal length, in mm, of the overall system, FN is an F-number, and 2ω is an angle of view. In "Lens Parameters", the first column denotes a lens surface or plane number from the object side, r in the second column denotes a radius of curvature, in mm, of a lens plane, d in the third column denotes a distance, in mm, between lens planes, v in the fourth column denotes an Abbe number of each lens with respect to the d-line (λ=587.6 nm) of a lens, the fifth column denotes a refractive index n of a lens with respect to the d-line, and the sixth column denotes a group number to which each lens belongs. Bf at the bottom of the third column represents a back focus.

The lens surfaces bearing asterisks (*) are aspheric surfaces. The radius of curvature (r) of an aspheric surface is a paraxial radius of curvature. An aspheric surface is expressed by the following formula:

$$X(h) = \frac{h^2/r}{1 + \sqrt{(1 - \kappa * h^2/r^2)}} + \sum_{i=1}^{5} (C_{2i} * h^{2i})$$

when h is a height, in mm, from the optical axis, X(h) is a distance, in mm, to the nodal plane of the aspheric surface at the height h, in mm, from the optical axis, r is a paraxial radius of curvature, in mm, κ is a conic constant, and $C_{2i}$, is an aspheric coefficient of the $2i^{th}$ degree.

In "Variable Air Gap for Zooming", f/β denotes a focal length f for a magnification β and $d_0$ denotes a distance, in mm, from the object to the lens surface that is located closest to the object.

TABLE 1

[Major Parameters]

| f = 28.9–77.5 | | FN = 2.9 | 2ω = 75.7–30.6° |
|---|---|---|---|

[Lens Parameters]

| | r | d | v | n | |
|---|---|---|---|---|---|
| 1 | 72.747 | 2.30 | 65.42 | 1.60300 | $G_1$ |
| 2 | 37.000 | 13.00 | | | |
| 3 | −172.809 | 2.10 | 61.09 | 1.58913 | $G_1$ |
| 4* | 39.894 | 1.00 | | | |
| 5 | 49.820 | 4.40 | 23.01 | 1.86074 | $G_1$ |
| 6 | 74.750 | ($d_6$) | | | |
| 7 | 63.402 | 1.60 | 23.01 | 1.86074 | $G_{2F}$ |
| 8 | 37.530 | 8.60 | 64.10 | 1.51680 | $G_{2F}$ |
| 9 | −75.887 | 1.60 | 25.50 | 1.80458 | $G_{2F}$ |
| 10 | −97.792 | ($d_{10}$) | | | |
| 11 | 96.034 | 3.60 | 60.14 | 1.62041 | $G_{2R}$ |
| 12 | 261.743 | 0.10 | | | |
| 13 | 54.262 | 6.00 | 55.60 | 1.69680 | $G_{2R}$ |
| 14 | −5995.277 | ($d_{14}$) | | | |
| | (aperture (stop) | 2.80 | | | |
| 15 | −74.414 | 2.20 | 35.72 | 1.90265 | $G_{3F}$ |
| 16 | −62.929 | 1.45 | 64.10 | 1.51680 | $G_{3F}$ |

TABLE 1-continued

| | | | | | |
|---|---|---|---|---|---|
| 17* | 121.380 | 2.50 | | | |
| 18 | −85.723 | 1.40 | 82.52 | 1.49782 | $G_{3R}$ |
| 19 | 31.093 | 2.60 | 25.50 | 1.80458 | $G_{3R}$ |
| 20 | 84.758 | $(d_{20})$ | | | |
| 21 | 459.690 | 1.40 | 23.01 | 1.86074 | $G_4$ |
| 22 | 40.240 | 7.30 | 82.52 | 1.49782 | $G_4$ |
| 23 | −49.771 | 0.10 | | | |
| 24 | 62.369 | 7.00 | 57.53 | 1.67025 | $G_4$ |
| 25 | −76.454 | 5.20 | | | |
| 26 | −32.524 | 2.00 | 39.61 | 1.80454 | $G_4$ |
| 27 | −50.194 | (Bf) | | | |

[Aspheric Data]

| Lens Plane | 4th plane | 7th plane |
|---|---|---|
| Conic Constant κ | −0.0842 | −3.9460 |
| Aspheric Coefficient $C_2$ | 0.0000 | 0.0000 |
| $C_4$ | −4.4790 × 10⁻⁷ | −3.2602 × 10⁻⁶ |
| $C_6$ | −5.6956 × 10⁻¹⁰ | 1.1210 × 10⁻⁸ |
| $C_8$ | 7.9321 × 10⁻¹³ | −8.6879 × 10⁻¹¹ |
| $C_{10}$ | −2.6103 × 10⁻¹⁶ | 2.0447 × 10⁻¹³ |

[Variable Air Gap for Variable Power]

| f/B | 28.9 | 43.0 | 77.5 | −0.0631 | −0.913 | −0.1672 |
|---|---|---|---|---|---|---|
| $d_0$ | ∞ | ∞ | ∞ | 401.441 | 419.214 | 417.398 |
| $d_6$ | 53.142 | 25.801 | 2.190 | 57.842 | 30.684 | 8.058 |
| $d_{10}$ | 7.063 | 7.063 | 7.063 | 2.363 | 2.179 | 1.195 |
| $d_{14}$ | 1.532 | 9.677 | 30.192 | 1.532 | 9.677 | 30.192 |
| $d_{2n}$ | 16.889 | 12.505 | 4.087 | 16.889 | 12.505 | 4.087 |
| Bf: | 39.683 | 45.490 | 58.820 | 39.683 | 45.490 | 58.820 |

[Parameters in Formulae]

$(A_w/l_w)/(A_t/l_t) = 0.819$
$A_w = 62.68$   $l_w = 92.52$
$A_t = 81.82$   $l_t = 98.86$
$R_{42}/f_4 = 0.62$
$R_{42} = 40.240$   $f_4 = 65.086$
$(R_{22} + R_{21})/(R_{22} - R_{21}) = 0.982$
$R_{21} = +54.262$   $R_{22} = -5995.277$

TABLE 2 f = 28.9–82.5   FN = 2.9   2ω = 76.1–28.9°

| | r | d | ν | n | |
|---|---|---|---|---|---|
| 1 | 68.649 | 2.30 | 65.42 | 1.60300 | $G_1$ |
| 2 | 42.005 | 12.00 | | | |
| 3 | −200.063 | 2.00 | 58.50 | 1.65160 | $G_1$ |
| 4* | 39.669 | 1.70 | | | |
| 5 | 56.552 | 4.40 | 23.01 | 1.86074 | $G_1$ |
| 6 | 80.192 | $(d_6)$ | | | |
| 7 | 74.866 | 1.60 | 23.01 | 1.86074 | $G_{2F}$ |
| 8 | 42.253 | 8.60 | 64.10 | 1.51680 | $G_{2F}$ |
| 9 | −111.649 | 1.60 | 25.50 | 1.80458 | $G_{2F}$ |
| 10 | −125.706 | $(d_{10})$ | | | |
| 11 | 63.859 | 6.00 | 60.14 | 1.62041 | $G_{2R}$ |
| 12 | −143.764 | 0.10 | | | |
| 13 | 48.361 | 4.00 | 55.60 | 1.69680 | $G_{2R}$ |
| 14 | 63.052 | $(d_{14})$ | | | |
| | (aperture stop) | 2.80 | | | |
| 15 | −80.845 | 2.20 | 35.72 | 1.90265 | $G_{3F}$ |
| 16 | 140.240 | 1.40 | 64.10 | 1.51680 | $G_{3F}$ |
| 17* | 83.911 | 2.50 | | | |
| 18 | −73.986 | 1.40 | 82.52 | 1.49782 | $G_{3R}$ |
| 19 | 31.399 | 3.50 | 25.50 | 1.80458 | $G_{3R}$ |
| 20 | −1240.249 | $(d_{20})$ | | | |
| 21 | 138.989 | 1.40 | 23.01 | 1.86074 | $G_4$ |
| 22 | 33.034 | 7.30 | 82.52 | 1.49782 | $G_4$ |
| 23 | −42.064 | 0.10 | | | |
| 24 | 55.077 | 7.00 | 57.53 | 1.67025 | $G_4$ |
| 25 | −116.050 | 5.20 | | | |

TABLE 2-continued

| | | | | | |
|---|---|---|---|---|---|
| 26 | −48.854 | 2.00 | 39.61 | 1.80454 | $G_4$ |
| 27 | −180.965 | (Bf) | | | |

[Aspheric Data]

| Lens Plane | 4th plane | 7th plane |
|---|---|---|
| Conic Constant κ | 0.0730 | 11.1165 |
| Aspheric Coefficient $C_2$ | 0.0000 | 0.0000 |
| $C_4$ | −4.4790 × 10⁻⁷ | −3.2602 × 10⁻⁶ |
| $C_6$ | −5.8276 × 10⁻¹⁰ | 2.0617 × 10⁻⁸ |
| $C_8$ | 6.0545 × 10⁻¹³ | −8.6879 × 10⁻¹¹ |
| $C_{10}$ | −2.6103 × 10⁻¹⁶ | 2.0447 × 10⁻¹³ |

[Variable Air Gap for Variable Power]

| f/B | 28.9 | 50.0 | 82.5 | −0.0642 | −0.1074 | −0.1813 |
|---|---|---|---|---|---|---|
| $d_0$ | ∞ | ∞ | ∞ | 395.278 | 416.064 | 409.886 |
| $d_6$ | 54.125 | 18.730 | 1.278 | 59.102 | 24.513 | 8.259 |
| $d_{10}$ | 10.017 | 10.017 | 10.017 | 5.039 | 4.235 | 3.036 |
| $d_{14}$ | 3.609 | 15.792 | 37.932 | 3.609 | 15.792 | 37.932 |
| $d_{26}$ | 17.467 | 10.521 | 2.699 | 17.467 | 10.521 | 2.699 |
| Bf: | 38.579 | 47.951 | 57.261 | 38.579 | 47.949 | 57.255 |

[Parameters in Formulae]

$(A_w/l_w)/(A_t/l_t) = 0.800$
$A_w = 61.58$   $l_w = 92.85$
$A_t = 80.26$   $l_t = 96.76$
$R_{42}/f_4 = 0.51$
$R_{42} = 33.034$   $f_4 = 65.086$
$(R_{22} + R_{21})/(R_{22} - R_{21}) = 7.58$
$R_{21} = +48.361$   $R_{22} = +65.086$

Figure 2B:
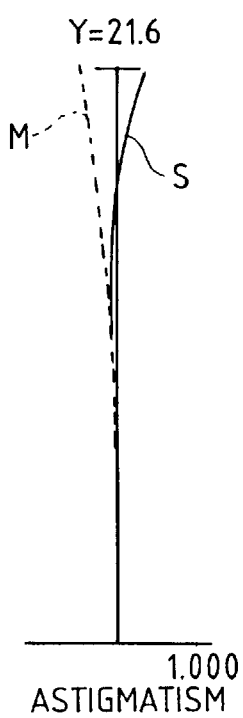
Figure 2C:
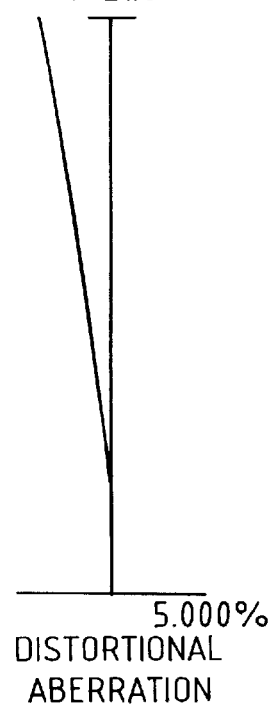
Figure 3A:
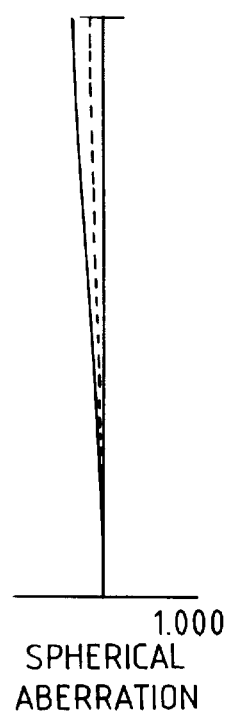
FIG. 3 illustrates the same aberrations of the first embodiment at an intermediate range in the infinity focusing state.
Figure 3B:
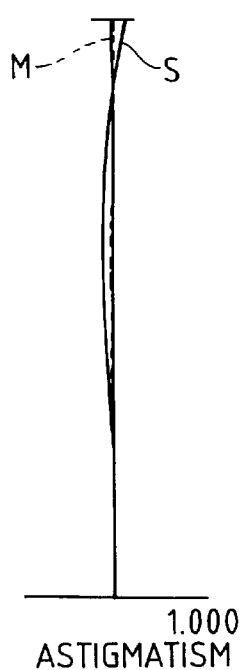
Figure 3C:
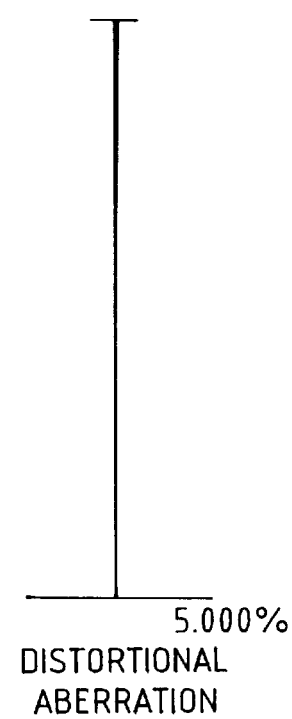
Figure 4A:
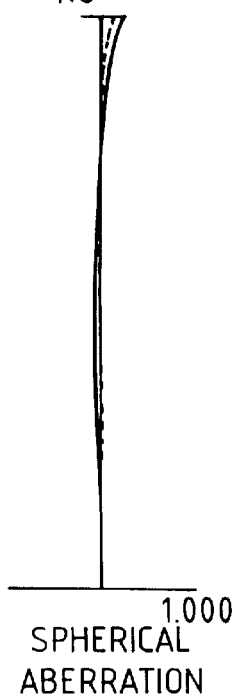
FIG. 4 illustrates the same aberrations of the first embodiment at a telephoto end in the infinity focusing state.
Figure 4B:
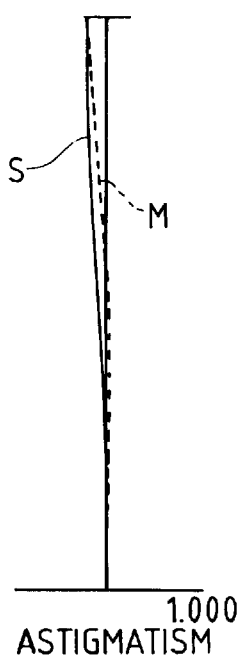
Figure 4C:
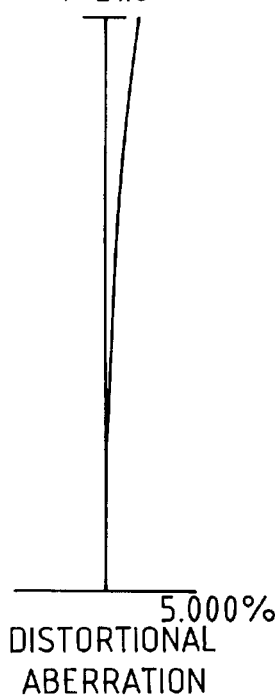
Figure 5A:
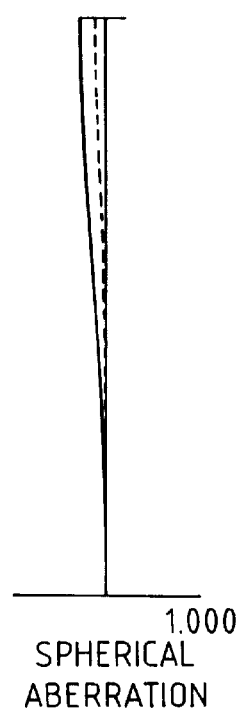
FIG. 5 illustrates various aberrations of the first embodiment at the wide-angle end in a close range focusing state.
Figure 5B:
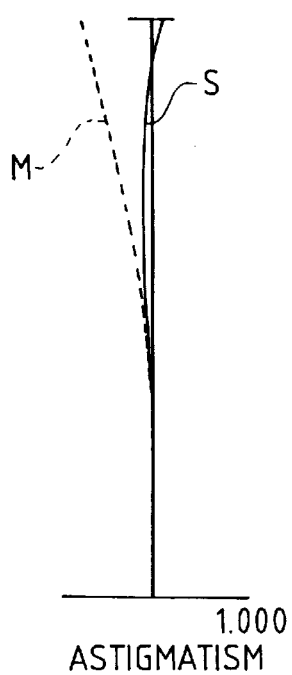
Figure 5C:
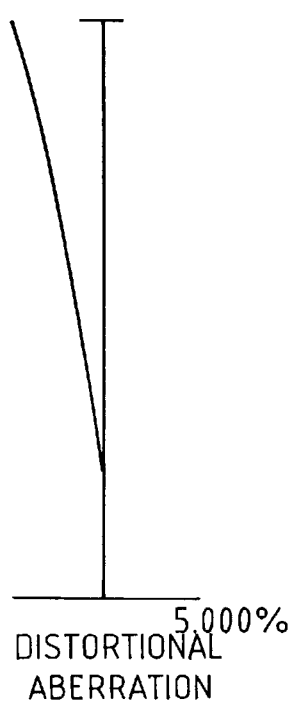
Figure 6A:
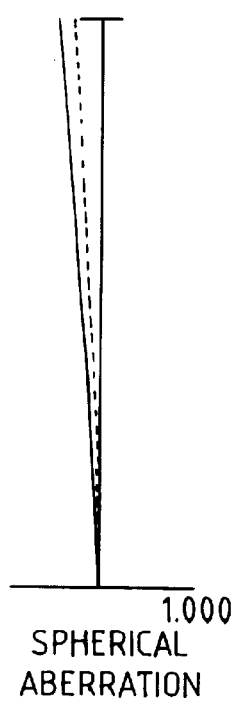
FIG. 6 illustrates the same aberrations of the first embodiment at the intermediate range in the close range focusing state.
Figure 6B:
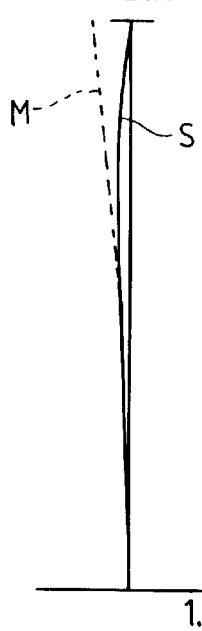
Figure 6C:
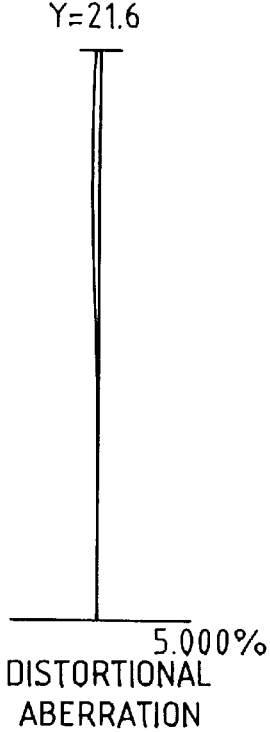
Figure 7A:
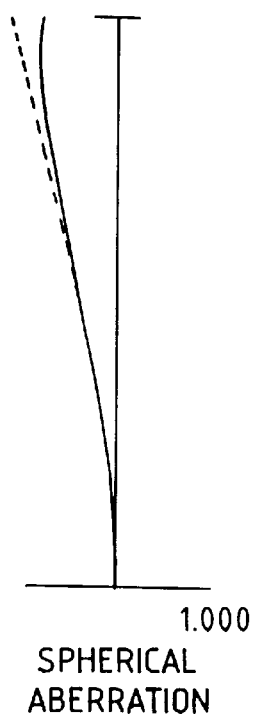
FIG. 7 illustrates the same aberrations of the first embodiment at the telephoto end in the close range focusing state.
Figure 7B:
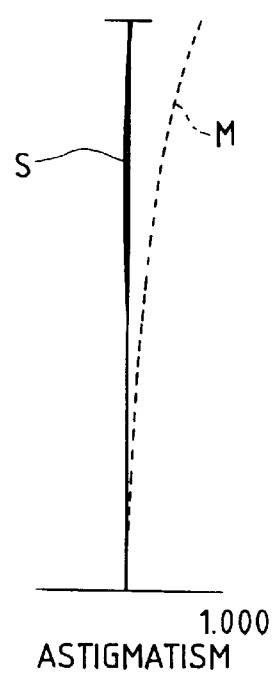
Figure 7C:
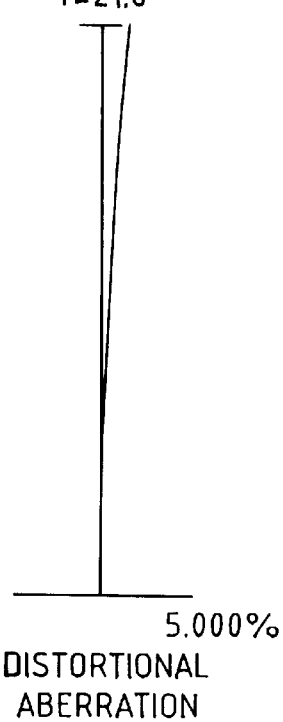
Figure 11A:
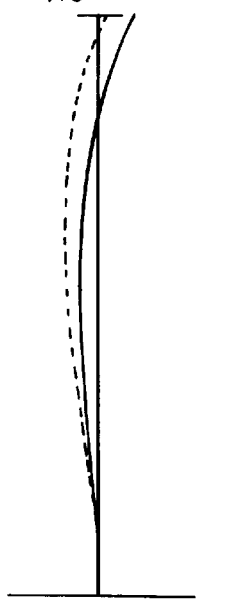
FIG. 11 illustrates the same aberrations of the second embodiment at a telephoto end in the infinity focusing state.
Figure 11B:
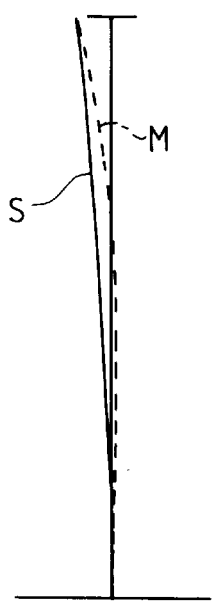
Figure 11C:
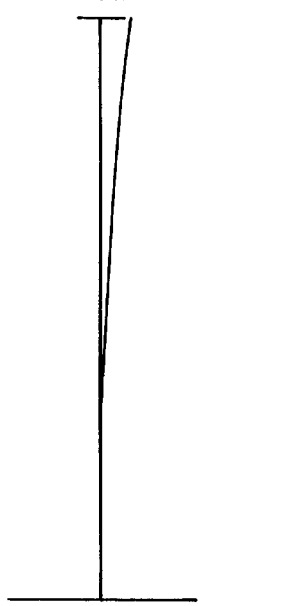
Figure 12A:
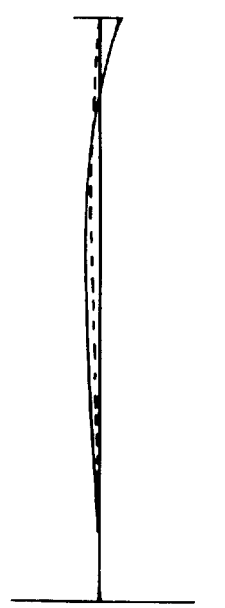
FIG. 12 illustrates various aberrations of the second embodiment at the wide-angle end in a close range focusing state.
Figure 12B:
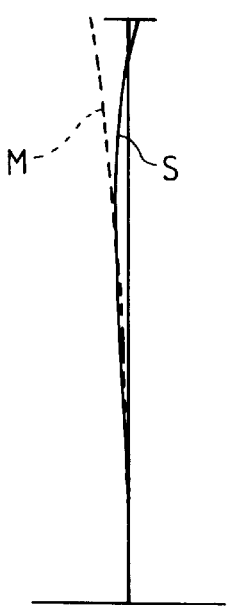
Figure 12C:
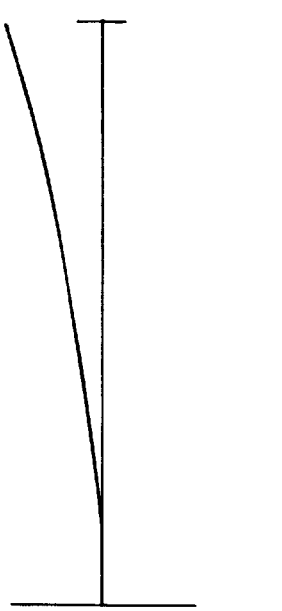
Figure 13A:
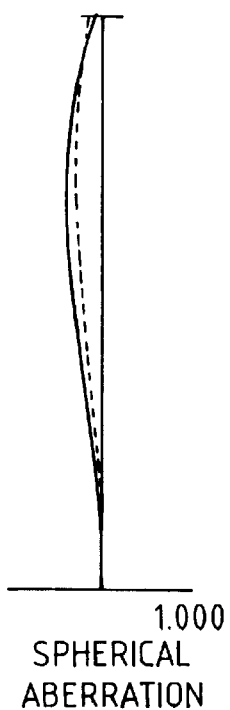
FIG. 13 illustrates the same aberrations of the second embodiment in the intermediate range in the close range focusing state.
Figure 13B:
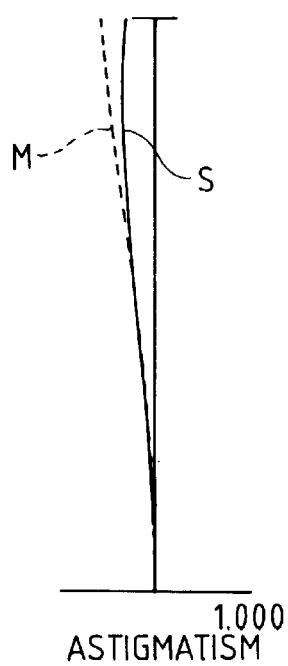
Figure 13C:
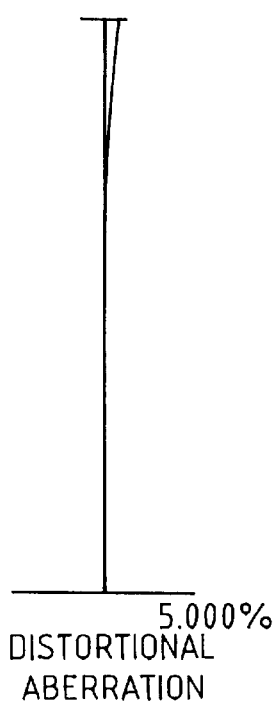
Figure 14A:
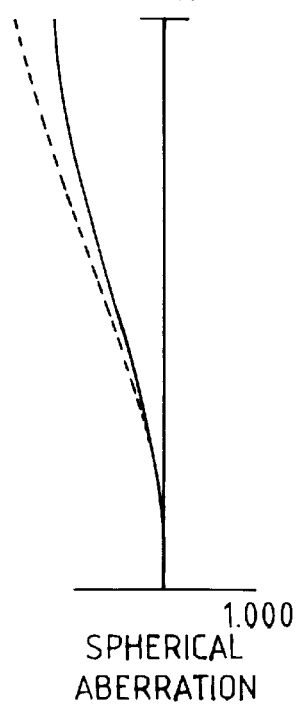
FIG. 14 illustrates the same aberrations of the second embodiment at the telephoto end in the close range focusing state.
Figure 14B:
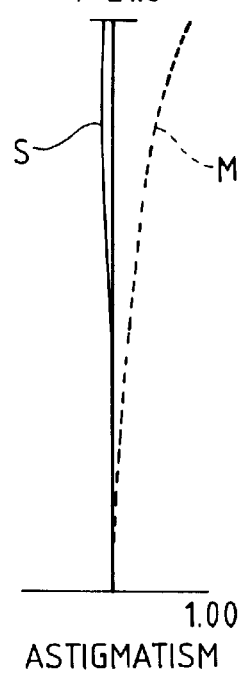
Figure 14C:
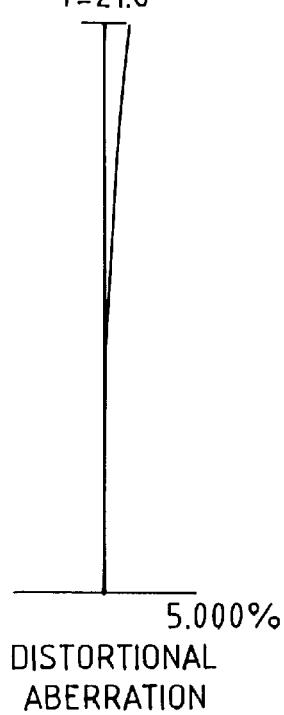
Figure 15A:
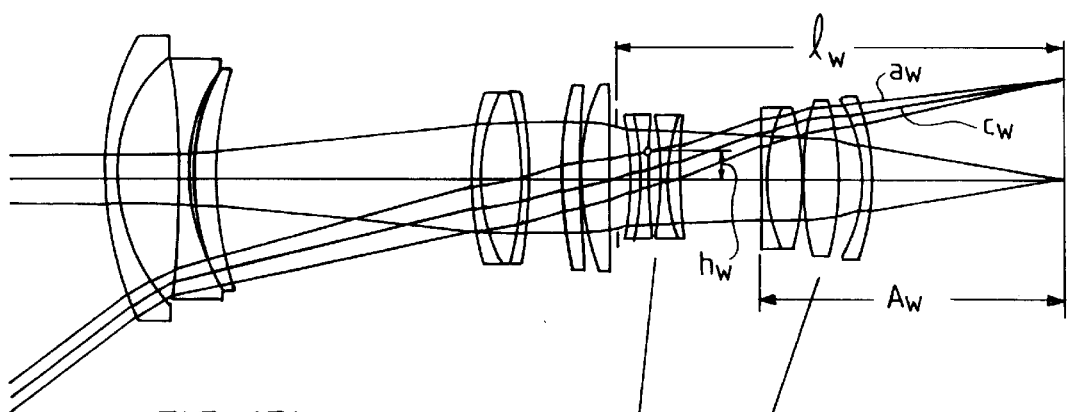
FIGS. 15A and 15B are diagrams used in explaining a first conditional formula in association with the first embodiment.
Figure 15B:
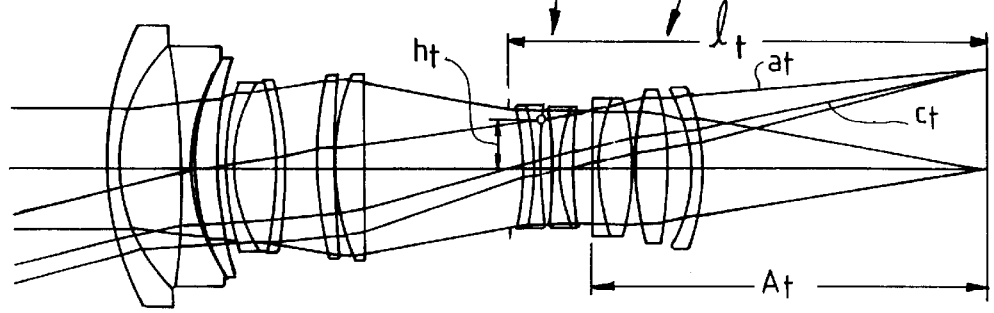

FIGS. 2 through 4 illustrate spherical aberrations, astigmatism, and distortional aberrations in the infinity focusing state in the first embodiment. FIG. 2 shows these aberrations at the wide-angle end, FIG. 3 shows the aberrations in the intermediate range, and FIG. 4 shows the aberrations at the telephoto end. FIGS. 5 through 7 illustrate the same aberrations of the first embodiment in the close range focusing state with different magnifications. FIGS. 9 through 14 illustrate the aberrations in the infinity focusing state and close range focusing state with different magnifications in the second embodiment. Regarding the spherical aberration, the dashed line indicates a sine condition breaking amount. As to astigmatism, the dashed line indicates a meridional image plane, and the solid line indicates a sagittal image plane.

As is clear from these figures, an excellent image quality is achieved in all focusing states over a wide range from infinity to a close range in both embodiments.

According to the invention, a compact and high-performance zoom lens is provided. The zoom lens has a large aperture diameter, with an F-number of 2.8 or greater, and a large variable power ratio from a wide-angle to quasi-infinity with a maximum angle of view of 70° or greater.

I claim:

1. A zoom lens comprising:
   a first lens group having a negative refractive power,
   a second lens group having a positive refractive power,
   a third lens group having a negative refractive power,
   a fourth lens group having a positive refractive power, and an aperture stop,
   the first lens group, the second lens group, the third lens group and the fourth lens group being positioned in order from an object side of the zoom lens,
   the third lens group including an aspheric lens having at least one concave and aspheric surface, the first, second and fourth lens groups being moved in a direction of an optical axis during zooming, wherein the zoom lens can satisfy the following condition $$0.5<(A_w/l_w)/(A_t/l_t)<1$$

when $A_w$ is a distance between an image plane and a lens plane that is located closest to the object side in the fourth lens group when the zoom lens is in a wide-angle condition, $l_w$ is a distance between the image plane and the aperture stop at the wide-angle end, $A_t$ is a distance between the image plane and the lens plane that is located closest to the object side in the fourth lens group when the zoom lens is in a telephoto condition, and $l_t$ is a distance between the image plane and the aperture stop at the telephoto end.

2. The zoom lens according to claim 1, wherein the aspheric lens having at least one concave and aspheric surface is in the third lens group and is a cemented lens.

3. The zoom lens according to claim 2, wherein the aperture stop is positioned in a vicinity of the third lens group and moved together with the third lens group.

4. The zoom lens according to claim 3, wherein the third lens group consists of a front lens group and a rear lens group, and one of the front and rear lens groups includes the aspheric lens having said at least one concave and aspheric surface and is movable in a direction crossing the optical axis.

5. The zoom lens according to claim 1, wherein the second lens group includes a cemented positive lens and two positive lenses in order from the object side of the zoom lens and satisfies a condition $$(R_{22}+R_{21})/(R_{22}-R_{21})>0.95$$

when $R_{21}$ is a radius of curvature of an object-side lens surface of a positive lens located closest to the image side of the zoom lens among the positive lenses of the second lens group and $R_{22}$ is a radius of curvature of an image-side lens surface of said positive lens located closest to the image side, and wherein the cemented positive lens is composed of three lenses cemented to each other.

6. The zoom lens according to claim 1, wherein the second lens group includes a cemented positive lens and two positive lenses in order from the object side of the zoom lens and satisfies a condition $$(R_{22}+R_{21})/(R_{22}-R_{21})>0.95$$

when $R_{21}$ is a radius of curvature of an object-side lens surface of a positive lens located closest to the image side of the zoom lens among the positive lenses of the second lens group and $R_{22}$ is a radius of curvature of an image-side lens surface of said positive lens located closest to the image side, and wherein the second lens group consists of a front lens group and a rear lens group, and focusing is performed by moving the front lens group of the second lens group in the direction of the optical axis.

7. The zoom lens according to claim 1, wherein the first lens group includes an image-side lens component, located closest to the image side of the zoom lens in the first lens group, and an object-side lens component, positioned adjacent to and on an object side of the image-side lens component, the image-side lens component and the object-side lens component forming an air lens having a shape of a positive meniscus lens with its convex surface on an object side thereof.

8. The zoom lens according to claim 5, wherein the aspheric lens having at least one concave and aspheric surface is in the third lens group and is a cemented lens.

9. The zoom lens according to claim 8, wherein the aperture stop is positioned in a vicinity of the third lens group and moved together with the third lens group.

10. The zoom lens according to claim 9, wherein the third lens group consists of a front lens group and a rear lens group, and one of the front and rear lens groups includes the aspheric lens having said at least one concave and aspheric surface and is movable in a direction crossing the optical axis.

11. The zoom lens according to claim 6, wherein the aspheric lens having at least one concave and aspheric surface is in the third lens group and is a cemented lens.

12. The zoom lens according to claim 11, wherein the aperture stop is positioned in a vicinity of the third lens group and moved together with the third lens group.

13. The zoom lens according to claim 12, wherein the third lens group consists of a front lens group and a rear lens group, and one of the front and rear lens groups includes the aspheric lens having said at least one concave and aspheric surface and is movable in a direction crossing the optical axis.

14. A zoom lens comprising:
a first lens group having a negative refractive power,
a second lens group having a positive refractive power,
a third lens group having a negative refractive power, and
a fourth lens group having a positive refractive power,
the first lens group, the second lens group, the third lens group and the fourth lens group being positioned in order from an object side of the zoom lens,
the first, second and fourth lens groups being moved in a direction of an optical axis during zooming,
the fourth lens group including a cemented positive lens component having a cemented convex surface on an object side thereof, a positive lens component, and a negative meniscus lens component convexed toward an image side of the zoom lens in order from the object side of the zoom lens, and satisfying a condition $$0.3<R_{42}/f_4<1.5$$

when $R_{42}$ is a radius of curvature of the cemented convex surface of the fourth lens group and $f_4$ is a focal length of the fourth lens group.

15. The zoom lens according to claim 14, and further comprising an aperture stop positioned in a vicinity of the third lens group and moved together with the third lens group.

16. The zoom lens according to claim 15, wherein the first lens group includes an image-side lens component, located closest to the image side of the zoom lens in the first lens group, and an object-side lens component, positioned adjacent to and on an object side of the image-side lens component, the image-side lens component and the object-side lens component forming an air lens having a shape of a positive meniscus lens with its convex surface on an object side thereof.

17. A zoom lens comprising:
a first lens group having a negative refractive power,
a second lens group having a positive refractive power,
a third lens group having a negative refractive power, and
a fourth lens group having a positive refractive power,
the first lens group, the second lens group, the third lens group and the fourth lens group being positioned in order from an object side of the zoom lens,
the first, second and fourth lens groups being moved in a direction of an optical axis during zooming, the second lens group including a cemented positive lens and two positive lenses in order from the object side of the zoom lens and satisfying a condition $$(R_{22}+R_{21})/(R_{22}-R_{21})>0.95$$

when $R_{21}$ is a radius of curvature of an object-side lens surface of a positive lens located closest to an image side of the zoom lens among the positive lenses of the second lens group and $R_{22}$ is a radius of curvature of an image-side lens surface of said positive lens located closest to the image side, the fourth lens group including a cemented positive lens component having a cemented convex surface on an object side thereof, a positive lens component, and a negative meniscus lens component convexed toward the image side of the zoom lens in order from the object side of the zoom lens, and satisfying a condition $$0.3<R_{42}/f_4<1.5$$

when $R_{42}$ is a radius of curvature of the cemented convex surface of the fourth lens group and $f_4$ is a focal length of the fourth lens group.

18. The zoom lens according to claim 17, wherein the cemented positive lens is composed of three lenses cemented to each other.

19. The zoom lens according to claim 18, wherein the second lens group consists of a front lens group and a rear lens group, and focusing is performed by moving the front lens group of the second lens group in the direction of the optical axis.

20. The zoom lens according to claim 17, wherein the first lens group includes an image-side lens component, located closest to the image side of the zoom lens in the first lens group, and an object-side lens component, positioned adjacent to and on an object side of the image-side lens component, the image-side lens component and the object-side lens component forming an air lens having a shape of a positive meniscus lens with its convex surface on an object side thereof.

* * * * *